United States Patent [19]

Tracy

[11] 3,760,835
[45] Sept. 25, 1973

[54] INDEX MEANS FOR REMOVABLE VALVE
[75] Inventor: Gene A. Tracy, Centerville, Minn.
[73] Assignee: The Cornelius Company, Anoka, Minn.
[22] Filed: Nov. 22, 1971
[21] Appl. No.: 200,990

[52] U.S. Cl............... 137/322, 137/383, 137/385, 137/607, 251/148
[51] Int. Cl............................................. F16l 29/00
[58] Field of Search............... 137/315, 316, 322, 137/360, 361, 383, 385, 607; 251/148, 149.6, 291; 220/55 A, 55 B, 292; 285/39, 91, 189, 305, 308; 287/119; 222/153, 182, 522, 523; 194/1 A, 1 B; 292/189; 306/28

[56] References Cited
UNITED STATES PATENTS
2,028,108  1/1936  Sklar............................. 292/189
3,124,373  3/1964  Thomsen........................ 285/91 X
3,441,046  4/1969  Cranage........................ 137/315 X
3,623,752  11/1971 Brown............................ 285/91
3,655,097  4/1972  Booth et al.................... 137/607 X Primary Examiner—Martin P. Schwadron
Assistant Examiner—David R. Matthews
Attorney—Carlton Hill et al.

[57] ABSTRACT

A valve assembly includes a mounting sleeve which has an upwardly opening recess, valve means that include a body slidable into said mounting sleeve, and a retaining key slidably guided in the body and movable in response to gravity into said recess to lock the body in said sleeve.

5 Claims, 3 Drawing Figures

PATENTED SEP 25 1973　　　　　　　　　　　　　3,760,835

INDEX MEANS FOR REMOVABLE VALVE

BACKGROUND

This invention pertains to a valve assembly, and more specifically to gravity responsive keying for locking a valve body to a mounting sleeve.

PRIOR ART

It has been known heretofore to rigidly secure a dispensing valve to a mounting sleeve, and to provide the mounting sleeve with keying means by which the mounting sleeve may be non-rotatably secured to support means such as a cabinet of a dispenser. Such structure is relatively difficult to disassemble for cleaning and service and has inherently required a good deal of complexity of construction to lock the dispensing valve to the keyed mounting sleeve whereby the amount of labor needed for cleaning and service has been increased.

SUMMARY OF THE INVENTION

The present invention is the provision or use of a gravity-responsive locking key in a valve body by which the body is locked to the keyed sleeve by merely aligning the retaining key with a recess in the sleeve. Removal is facilitated by an access opening by which an implement may be inserted to raise the retaining key, thereby freeing the valve body for slidable removal from the sleeve.

Accordingly, it is an object of the present invention to provide an improved means for detachably securing a valve body to a mounting sleeve.

A further object of the present invention is to provide retaining means that are gravity responsive so as to enable locking of a valve body to a mounting sleeve only when the valve body is in the desired angular orientation about a horizontal axis.

A still further object of the present invention is to provide a dispensing valve assembly which can be readily demounted from a dispenser cabinet and similarly readily reinstalled without the use of any tooling.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWINGS

AS SHOWN ON THE DRAWINGS

Figure 1:
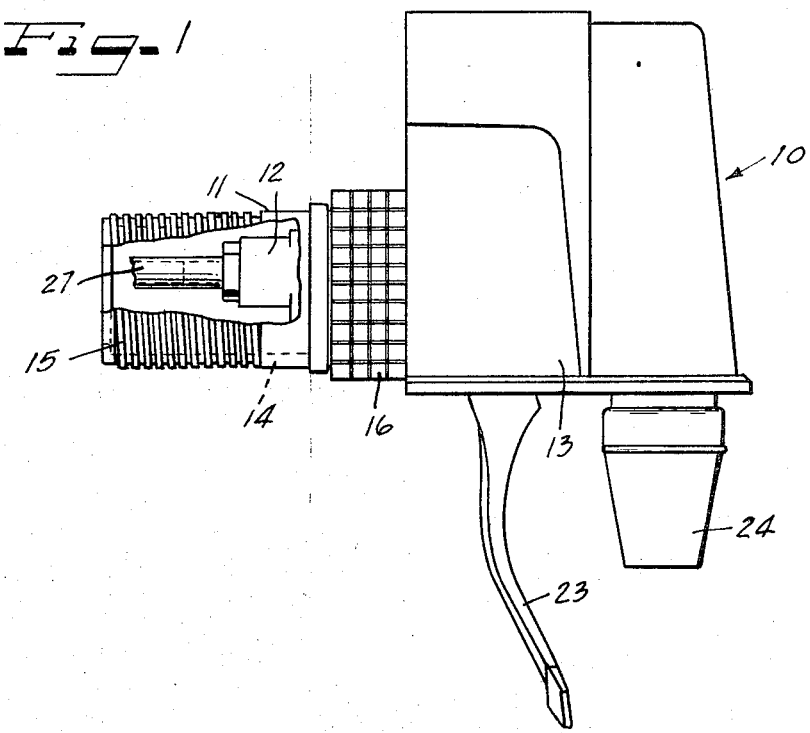
FIG. 1 is a side elevational view, partially broken away, of a dispensing valve provided in accordance with the present invention.

The principles of the present invention are particularly useful when embodied in a valve assembly such as shown in FIG. 1, generally indicated by the numeral 10. The valve assembly 10 includes a mounting sleeve 11 on which valve means (closed to view) are supported. The valve means has a body that comprises a pair of slidably detachable body sections, one of which is shown at 12 and the other of which is enclosed within the cover 13. The mounting sleeve 11 has an axially extending locating keyway 14 at the lower part of mounting threads 15 by which the valve assembly 10 may be clamped and keyed to a dispenser cabinet as is known. A threaded locking ring 16 acts between the body section that is enclosed by the cover 13 and the sleeve 11 in a known manner. Thus the valve means are slidable into an end of the mounting sleeve 11 and are held therein by the locking ring 16.

Figure 2:
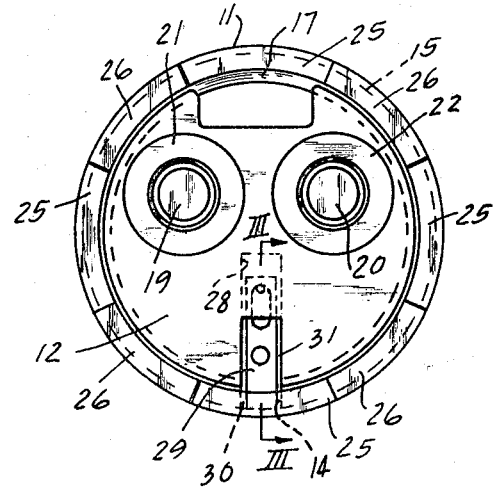
FIG. 2 is an elevational view taken along line II—II when certain of the structure has been removed.

When the locking ring 16 has been unscrewed, the structure shown to the right thereof in FIG. 1 becomes detached, thereby exposing to view the structure shown in FIG. 2. For convenience of illustration in FIG. 2, the locking ring 16 has also been removed.

Figure 3:
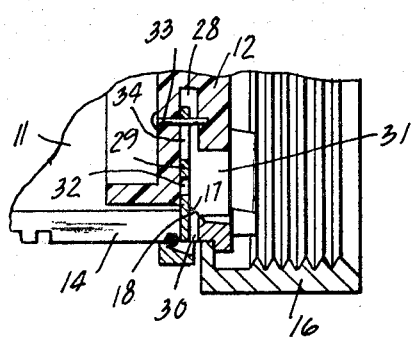
FIG. 3 is a fragmentary cross-sectional view taken along line III—III of FIG. 2.

The mounting sleeve 11 has an internal annular shoulder 17 directed toward the viewer in FIG. 2 and also shown in FIG. 3. The body 12 of the valve means is slidable into and out of the end of the mounting sleeve 11, inward movement being arrested by engagement between an external annular shoulder 18 with the internal shoulder 17 of the mounting sleeve. The body 12 supports a pair of self closing valve means 19,20 (FIG. 2) that project from a pair of bosses 21,22 which are received in a complemental formation in the second section of the valve means, and each of the valve means 19,20 communicates with further valve means under the control of an actuator 23 for mixing and discharging two beverage ingredients through a nozzle 24.

The sleeve 11 is provided with alternate arcuate recesses 25 and projections 26 which interfit with an identically shaped formation on the body section which has been removed for clarity of illustration whereby that part of the structure shown in FIG. 1 under the cover 13 is directly keyed to the sleeve 11. That part of the structure also has complemental recesses that receive the bosses 21 and 22 of the body 12 and engage and actuate the valve means 19,20 in response to tightening of the locking ring 16. The peripheral recesses 25, the peripheral projections 26, the bosses 21,22 and the valves 19,20 jointly respectively illustrate also the complemental peripheral projections, peripheral recesses, cylindrical bores and fluid passages of the other body section, and further illustration thereof is not necessary. For further details of such construction, the reader is directed to an allowed application of M.E. Heyne, Ser. No. 199,164, filed Nov. 16, 1971, now U.S. Pat. No. 3,730,210.

The valve body 12 carries self-closing valve means to which a pair of beverage lines 27 are connected. Owing to the asymmetrical location of the valve means 19,20, it is necessary that the valve section 20 be angularly oriented correctly with respect to the sleeve 11 before the other valve section is joined therewith. Accordingly, in accordance with the principles of the present invention, the valve body 12 is provided with a guide slot 28 within which there is disposed a retaining key 29 which is movable from an upward or retracted position, and movable in response to gravity, to an extended or lowered position as illustrated wherein the retaining key 29 partially projects radially from the body 12 into a recess 30. In this embodiment, the shoulders 17,18 are so disposed that the recess 30 is an end portion of the keyway 14 in the sleeve 11. If it is desired to disconnect the body 12 from the sleeve 11 without inverting the dispenser and without disengaging the mounting sleeve at the threads 15, the body section 12 may be readily released by means of access with an implement such as a tip of a pencil projecting through an opening 31 against the retaining key 29, an opening 32 being provided in the retaining key 29 to facilitate such movement. In order that the retaining key 29 will not drop out of the body 12 when the body is being separately handled, there is provided a pin-and-slot connection between the body 12 and the retaining key 29. To that end, a pin 33 is carried by the body and extends through the guide slot 28 and also through an elongated slot 34 in the pin 29.

When the body 12 with its valve means is held in the hand, the lines 27 can be readily drawn through the adjacent end of the sleeve and slipped onto barbed fittings on the inner ends of the valve means 19,20. The body 12 is then so tilted that gravity moves the retaining key to its retracted position, after which the body 12 is inserted into the mounting sleeve 11 with the shoulders 17,18 in engagement. Thereupon, the body 12 is merely rotated until the retaining key 29 drops into the recess 30.

It is within the province of this invention to make the body of this device functionally as having only one section whereby the projections and recesses 26,25 can be omitted, and to construct the valve means to accommodate only one liquid, the opening 31 being then correspondingly lengthened in a forward direction.

Although various minor modifications might be suggested by those versed in the art, it is to be understood that I wish to embody within the scope of the patent warranted hereon, all such embodiments as reasonably and properly come within the scope of my contribution to the art.

I claim as my invention:

1. A valve assembly comprising:
   a. a mounting sleeve adapted to be rigidly secured to support means, and having a recess opening upwardly into the interior of said sleeve;
   b. valve means having a body slidably axially receivable without rotation into an end of said mounting sleeve but rotatable therein; and
   c. a retaining key slidably guided in a guide slot in said body, and movable in response to gravity from a retracted position to an extended locking position partially in said recess when said body is positioned axially and angularly with said slot in alignment with said recess, thereby locking said valve means to said mounting sleeve in a predetermined axial angular position.

2. A valve assembly according to claim 1 in which said sleeve has an axially extending locating keyway and an internal annular shoulder, said body having an external annular shoulder engageable with said internal annular shoulder, and said recess comprising an end portion of said keyway.

3. A valve assembly according to claim 1 in which said body has an opening communicating with said guide slot through which a separate implement may be directed against said retaining key for raising it out of said recess against the force of gravity.

4. A valve according to claim 3 in which said sleeve has an axially extending locating keyway and an internal annular shoulder, said body having an external annular shoulder engageable with said internal annular shoulder.

5. A valve assembly according to claim 1, the body of said valve means comprising slidably detachable body sections, a first of which body sections having said guide slot and self closing valve means, and a second of which body sections having a fluid passage leading to a spout and under the control of a manual actuator and communicating with said self-closing valve means and being directly keyed to the end of said sleeve, and a threaded locking ring acting between said second body section and said sleeve.

* * * * *